(12) United States Patent
Nett et al.

(10) Patent No.: US 8,454,089 B2
(45) Date of Patent: Jun. 4, 2013

(54) FASTENING DEVICE FOR A CHILDREN'S VEHICLE SEAT AND CHILDREN'S VEHICLE SEAT

(75) Inventors: Reiner Nett, Aschaffenburg (DE); Volker Porrmann, Aschaffenburg (DE); Rüdiger Boll, Bessenbach (DE); Anke Leicht, Aschaffenburg (DE)

(73) Assignee: Takata AG, Aschaffenburg (DE)

(*) Notice: Subject to any disclaimer, the term of this patent is extended or adjusted under 35 U.S.C. 154(b) by 0 days.

(21) Appl. No.: 13/541,452

(22) Filed: Jul. 3, 2012

(65) Prior Publication Data

US 2012/0267926 A1 Oct. 25, 2012

Related U.S. Application Data

(63) Continuation of application No. PCT/EP2011/050092, filed on Jan. 5, 2011.

(30) Foreign Application Priority Data

Jan. 11, 2010 (DE) .......................... 10 2010 000 780

(51) Int. Cl.
*A47D 1/10* (2006.01)
(52) U.S. Cl.
USPC ........................................................ 297/253
(58) Field of Classification Search
USPC ................ 297/253, 250.1, 252, 256.13
See application file for complete search history.

(56) References Cited

U.S. PATENT DOCUMENTS

| 4,480,870 A * | 11/1984 | von Wimmersperg ... 297/216.11 |
| 8,100,474 B2 * | 1/2012 | Christ et al. ................... 297/253 |
| 8,182,034 B2 * | 5/2012 | Glance ........................... 297/253 |
| 2009/0273215 A1 | 11/2009 | Barker et al. |

FOREIGN PATENT DOCUMENTS

| DE | 196 46 621 C1 | 11/1997 |
| DE | 20 2007 012 746 U1 | 1/2008 |
| EP | 0 970 842 A1 | 1/2000 |
| EP | 1 344 679 A2 | 9/2003 |
| EP | 1 369 293 A1 | 12/2003 |
| EP | 1 369 294 A1 | 12/2003 |
| EP | 2 251 225 A1 | 11/2010 |
| WO | WO-2007/020350 A1 | 2/2007 |
| WO | WO-2007/029010 A2 | 3/2007 |

OTHER PUBLICATIONS

International Search Report in PCT/EP2011/050092 dated May 6, 2011.

* cited by examiner

*Primary Examiner* — Milton Nelson, Jr.
(74) *Attorney, Agent, or Firm* — Foley & Lardner LLP

(57) ABSTRACT

A fastening device for a child vehicle seat is provided. The fastening device includes two connecting elements which are suitable and formed to cooperate with an anchoring member arranged on a vehicle for fixing a child seat on the vehicle. The connecting elements are formed or arranged at the two ends or end regions of a bent connecting tube. The connecting tube has a portion between its ends, which is rotatably mountable on a child seat.

15 Claims, 4 Drawing Sheets

FASTENING DEVICE FOR A CHILDREN'S VEHICLE SEAT AND CHILDREN'S VEHICLE SEAT

CROSS-REFERENCE TO RELATED APPLICATIONS

This application is a continuation of International Patent Application Number PCT/EP2011/050092, filed on Jan. 5, 2011, which was published in German as WO 2011/083118. The foregoing international application is incorporated by reference herein.

BACKGROUND

This application relates to a fastening device for a child vehicle seat and to a child vehicle seat with such fastening device.

It is known to equip child seats with connecting elements which allow a rigid attachment of the child seat to anchoring means which are arranged at the vehicle, for example in the gap between back cushion and seat cushion of a vehicle seat. Such fastening system for a child vehicle seat is known under the term ISOFIX.

For child seats which are connectable with a vehicle by using ISOFIX or a comparable system, it is desirable to provide for an adaptation to as many different seat bench and ISOFIX anchoring geometries as possible. The resulting connection between the child seat and the vehicle should be as firm and rigid as possible.

In this connection it is known, for example, from EP 0 970 842 B1, EP 1 369 293 B1 and DE 196 46 621 C1 to design a fastening device for a child seat with a translatory or a rotatory degree of freedom. EP 0 979 842 B1, for example, describes a translatory shiftability of a seat by using guide rails. EP 1 369 293 B1 describes a translatory and a rotatory movement of a fastening device by using a carriage rotatably connected with a child seat frame. DE 196 46 621 C2 describes a pivotable element which consists of two unilaterally mounted lever arms, which are connected with each other by an interconnecting element.

From the documents EP 1 344 679 A2 and EP 1 369 294 A1 child vehicle seats are known, which each comprise a tube arrangement for attaching the child vehicle seat to vehicle-mounted anchoring means.

SUMMARY

It is an object of the present invention to provide a fastening device for a child vehicle seat which can easily be realized and can provide both a translatory and a rotatory degree of freedom. Furthermore, a corresponding child vehicle seat should be provided.

The fastening device according to an exemplary embodiment of the invention includes a bent connecting tube, at whose two ends or end regions one connecting element each is formed or arranged, which provides for a rigid connection with anchoring means of a vehicle. Between its two ends, the connecting tube comprises a portion which is rotatably mountable on the child seat or on a part connected or connectable with the child seat.

The solution according to the invention is characterized by a simple design, as merely one element, namely a tube (which can, however, be designed in a multipart form), is used for arranging the connecting elements. In addition, the solution according to the invention allows to provide a translatory degree of freedom, in that it can be provided that the connecting tube is mountable on the child seat in different longitudinal positions. By using a tube, it is also easily possible to provide a rotatory degree of freedom.

The invention creates a fastening device comprising rigid and few components, which can do without a welded construction. Moreover, the fastening device can be tested separately. In general, there is provided a light-weight, inexpensive fastening device for a child seat, which can be realized with little effort.

A child seat in the sense of the present invention is any structure which serves the transport of a child, an infant or a baby in a vehicle. In particular, beside actual child seats, this term also covers booster cushions and baby carriers.

Connecting tube in the sense of the present invention designates any oblong structure with a substantially constant or each partly substantially constant cross-section, wherein this term not only refers to tubes, but also to massive, non-hollow oblong structures.

In one exemplary aspect of the invention it is provided that the connecting tube is symmetrical. For example, the connecting tube is U-shaped with two legs and a base, wherein one of the legs of the connecting tube each forms a connecting element or is connected with such connecting element and the base of the connecting tube is mountable on the child seat. The base extends substantially straight and vertical to the two legs. In principle, however, a symmetrical formation of the connecting tube also can be effected in some other way, for example by using an elliptical shape or a parabolic shape.

In a further exemplary aspect of the invention, the connecting tube is formed as round tube. This has the advantage that the portion of the connecting tube which is mountable on the child seat is pivotable about the corresponding bearing without any further measures and construction elements, which leads to a pivotability of the connecting tube as a whole. Due to its circular shape, the connecting tube thus is easily rotatably mountable on the child seat or on a part connected with the same. Beside an exactly circular cross-sectional shape of the connecting tube, cross-sections which slightly differ from a circular shape can also be taken into account, such as for example an oval shape.

In a further exemplary aspect of the invention it is provided that the connecting tube is formed in one piece, i.e. consists of exactly one bent tube. In other variants it can alternatively be provided that the connecting tube consists of several portions, which for example each are connected with each other via a bayonet lock. In this case, too, however a connecting tube generally exists, as all such portions are designed tubular.

The connecting elements can form connecting bodies, which each are connected with an end or an end region of the connecting tube. For example, such connecting body forms a hollow cylindrical opening, which allows to put the connecting element onto an end region of the connecting tube. In addition, such connecting element of course includes connecting structures such as a buckle latch, which provide for a connection with anchoring structures arranged on the vehicle.

In one exemplary aspect, as mentioned already, the connecting tube is rotatably mountable on the child seat, namely such that the connecting elements are pivotable on the child seat in vertical direction. Thus, a rotatory degree of freedom is provided, which provides for swiveling in the y-axis (relative to the longitudinal direction of the vehicle). This allows an adaptation to anchoring geometries, which in different vehicles are arranged at different heights, e.g. on a vehicle seat or on a vehicle seat bench. The angular range about which the connecting elements are pivotable for example amounts to up to 20° (proceeding from a horizontal position).

In a further exemplary aspect of the invention the connecting tube is mountable on the child seat to be adjustable in various longitudinal positions in x-direction (relative to the longitudinal direction of the vehicle). For this purpose, a latching plate is provided in one aspect, which forms a plurality of transverse grooves which each serve to receive a portion of the connecting tube. The transverse grooves are formed in the latching plate one behind the other in x-direction, so that to each longitudinal position of the connecting tube a transverse groove of the latching plate is associated.

In one exemplary aspect it is furthermore provided that the latching plate is pivotable about a swivel axis articulated to the child seat, wherein in a first, non-swiveled basic position of the latching plate the connecting tube extends and is mounted in one of the transverse grooves of the latching plate and in a second, swiveled position of the latching plate is movable relative to the latching plate. In the second position, an adjustment of the longitudinal position of the connecting tube can be made. Mounting the connecting tube in a transverse groove is effected without any further measures in a rotatable way, in case the connecting tube is formed as round tube.

Furthermore, it can be provided that the latching plate is spring-biased, for example by means of spring elements connected with the latching plate, so that the latching plate automatically returns from a swiveled position into the basic position.

The invention furthermore relates to a child vehicle seat with a fastening device, wherein the connecting tube of the fastening device is rotatably mounted on the child seat. The fastening device is formed in the bottom region of the child seat. For this purpose it can be provided, for example, that the child seat consists of a lower part and an upper part and the fastening device is inserted between the same. The connecting elements arranged or formed at the ends of the connecting tube protrude from the child seat in direction of the anchoring means, with which they cooperate for fixing the child seat.

Furthermore, it can be provided that the child seat forms coulisses which provide for swiveling the connecting tube relative to the child seat. Such coulisses are formed for example in the side bolsters of the child seat.

BRIEF DESCRIPTION OF THE DRAWINGS

The invention will be explained in detail below by means of several exemplary embodiments with reference to the Figures of the drawing, in which.

DETAILED DESCRIPTION

Figure 1:
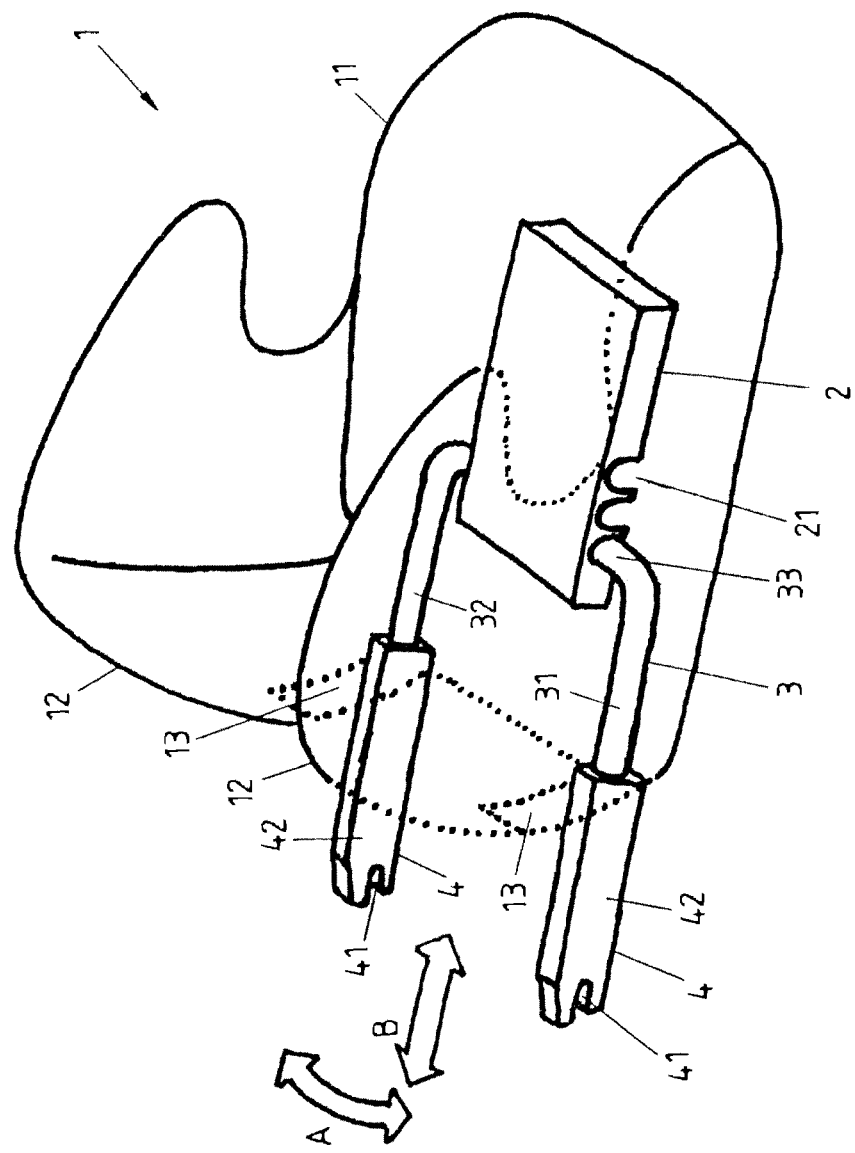
FIG. 1 shows a perspective and schematic representation of the construction of a child vehicle seat with a fastening device which includes a U-shaped bent connecting tube with two ISOFIX connecting elements and a latching plate.

FIG. 1 shows an exemplary embodiment of a child vehicle seat 1, which comprises a fastening device which serves the rigid arrangement and fixation of the child seat in a vehicle, in particular on a vehicle seat. The vehicle seat includes a seating surface 11 and two side bolsters 12. It is, however, also possible that the child seat has no side bolsters and is formed as pure booster cushion. Child seats in the sense of the present invention in addition also comprise baby carriers.

The fastening device comprises a bent connecting tube 3, which in the illustrated exemplary embodiment, however, is not necessarily U-shaped. The connecting tube 3 correspondingly has two legs 31, 32 arranged parallel to each other, which are connected with each other by a transversely extending base 33. The connecting tube 3 hence forms a bow and subsequently also is referred to as bow 3.

The connecting tube 3 is formed as round tube, i.e. it has a circular cross-section.

At the two ends and end regions of the bow 3, namely at the legs 31, 32 a connecting element 4 each is attached. In the illustrated exemplary embodiment it is provided for this purpose that each connecting element 4 has an oblong connecting body 42 with a cylindrical bore into which a leg 31, 32 of the bow 3 is introduced. The actual connecting structure 41, which allows a rigid connection with anchoring means of the vehicle, is formed at the ends of the respective connecting body 42.

In the illustrated exemplary embodiment, the connecting elements 4 are connecting elements which are formed according to the fastening system ISOFIX. This fastening system is standardized in the standard ISO 13216. The connecting elements 4 can, however, also be designed in some other way.

It should be noted that the bow 3 with the connecting elements 4 provides a rigid sub-assembly which provides for a rigid and firm connection of the child seat 1 with the motor vehicle.

For pivotably mounting and fixing the bow 3 on the child seat a latching plate 2 is provided, which includes a plurality of transversely extending latching grooves 21. Fixing the latching plate 2 on the child seat 1 can be effected in a variety of ways. In one exemplary embodiment, the child seat 1 is designed in a two-part form consisting of an upper part and a lower part, wherein the latching plate is arranged between upper part and lower part. In such a design, the two side bolsters 12 of the child seat 1 are connected with the upper part.

With reference to FIG. 1 it can be seen that by the plurality of transverse grooves 21 of the latching plate 2 a translatory degree of freedom is provided, which is indicated by the double arrow B and which allows to arrange the bow 3 and with the same the connecting elements 4 in different longitudinal positions (relative to the x-axis of a vehicle). Depending on in which one of the transverse grooves 21 of the latching plate 2 the base 33 of the bow 3 is mounted, a different longitudinal position is defined. For adjusting the longitudinal position, the latching plate 2 for example is pivotable, as will yet be explained with reference to FIGS. 2A, 2B.

The latching plate 6 thus provides for latching and mounting the bow 3 on the child seat 1 in different longitudinal positions.

Due to its design circular in cross-section, the bow 3 is mounted to be rotatable automatically and without any further measures inside the transverse grooves 21 in the region of its base 33. This leads to the fact that the bow 3 and with the same the connecting elements 4 is pivotable about an axis which coincides with the axis of the base 33. The pivotability is indicated in FIG. 1 by the double arrow A.

In the side bolsters 11 of the child seat 1 coulisses 13 are formed, in which the legs 31, 32 of the bow 3 or the connecting elements 4 put onto the same are guided. The coulisses 13 at least partly extend in vertical direction (along the y-axis relative to the longitudinal direction of the vehicle). Together with the natural rotatability of the base 33 of the bow 3 in the latching plate 2, the coulisses 13 provide for rotating the bow 3 as a whole and hence the connecting elements 4 in direction of the double arrow A. In this way, a rotatory degree of freedom is provided in addition. The angle of rotation, about which the connecting elements 4 are rotatable proceeding from the horizontal position shown in FIG. 1, is specified by the length of the coulisses 13. A corresponding swiveling in direction of the double arrow A is effected for example about an angle of up to 20°, up to 18° or up to 16°. Smaller angles of rotation can also be provided.

The fastening device shown in FIG. 1 thus provides both a translatory and a rotatory degree of freedom for the connecting elements 4. This allows to perform a translatory displacement and a rotational adjustment of the bow 3 and of the connecting elements 4 connected with the same adapted to the anchoring geometries currently existing in a vehicle or a vehicle seat. The resulting connection between the child seat and the vehicle is rigid and of high strength. By utilizing the natural rotatability of the bow 3 designed as round tube, the rotatory degree of freedom is provided in a simple and inexpensive manner.

Figure 2A:
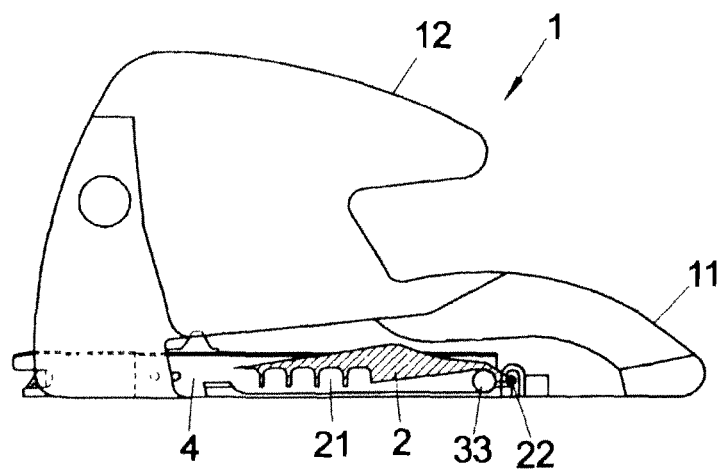
FIG. 2A shows a lateral, partly sectional representation of a child seat with a fastening device corresponding to FIG. 1, wherein the latching plate is shown in a first position.
Figure 2B:
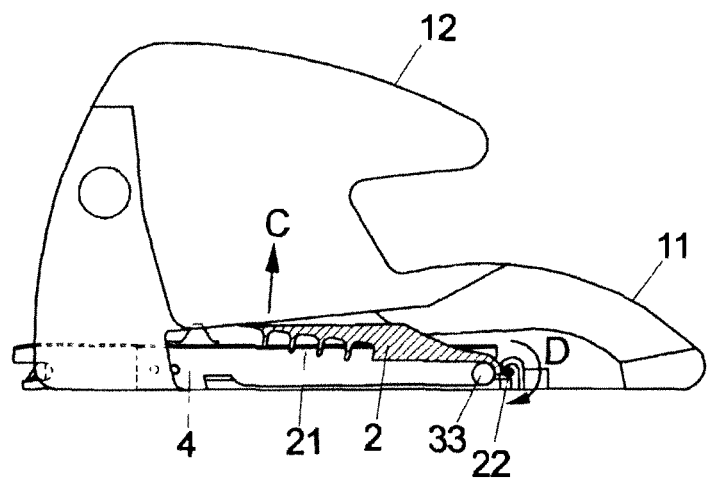
FIG. 2B shows the child seat of FIG, 2A, wherein the latching plate is shown in a second, swiveled position.

With reference to an exemplary embodiment, FIGS. 2A and 2B illustrate the latching of the bow 3 in a transverse groove 21 of the latching plate 2. As shown in FIGS. 2A, 2B, the latching plate 2 is attached to the child seat 1 so as to be rotatable about an axis 22. In the representation of FIG. 2A, the bow 3 is completely inserted into the child seat 1. In this position favorable for example during a transport of the child seat 1, the base 33 of the bow 3 does not extend inside one of the transverse grooves 21 of the latching plate 2.

As shown in FIG. 2B, the latching plate 2 is pivotable. On swiveling, it moves upwards, as indicated by the arrow C. It performs a rotary movement D about the axis 22. A corresponding lifting and swiveling of the latching plate 2 is realized for example by means of a belt 6, which is not shown in FIGS. 2A and 2B, but in addition in FIG. 3.

Figure 3:
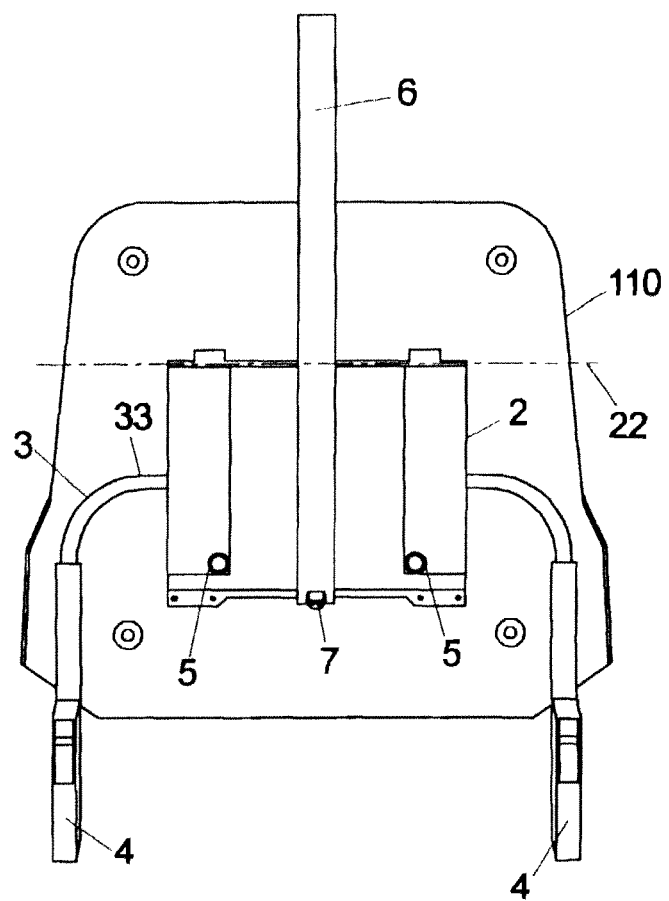
FIG. 3 shows a top view of a lower part of a child seat, on which a fastening device corresponding to FIGS. 1, 2A, 2B is arranged.

FIG. 3 shows a top view of a lower part 110 of the child seat 1, on which the latching plate 2 is mounted to be swiveled along the axis of rotation 22. For providing the possibility of swiveling the latching plate 2 about the axis of rotation 22 the belt 6 is provided, which is centrally attached to the end face of the latching plate 2 opposite the axis of rotation 22 by means of a fastening means 7. By simply pulling the belt 6 it is achieved that the latching plate 2 is swiveled upwards about the axis of rotation 22 corresponding to the representation of FIG. 2B. The swiveled position represents a second position of the latching plate, whereas the non-swiveled position represents a first basic position of the latching plate 2.

What is likewise shown in FIG. 3 is the bow 3, whose base 33 extends in one of the transverse grooves 21 of the latching plate 2 which are not visible in FIG. 3. The connecting elements 4 also are visible.

On the arrangement of lower seat part 110 and fastening device 2, 3 as shown in FIG. 3 an upper seat part is mounted, for example, which on the one hand comprises the seating surface 11 and the seat bolsters 12. In principle, the arrangement of the latching plate 6 in the bottom region of a child seat can, however, also be effected in some other way, for example by arranging and fixing the same in a recess of a one-part child seat.

Furthermore, FIG. 3 shows two spring elements 5 which are mounted on the upper surface of the latching plate 2 and provide a spring bias of the latching plate 2. The spring force of the springs 5 thus leads to the fact that the latching plate 2 is lifted against a spring force and upon completion of a tension on the belt 6 the latching plate 2 again returns into its basic position, in which it blocks the base 33 of the bow 3 and hence the bow 3 against a translatory movement.

Figure 4:
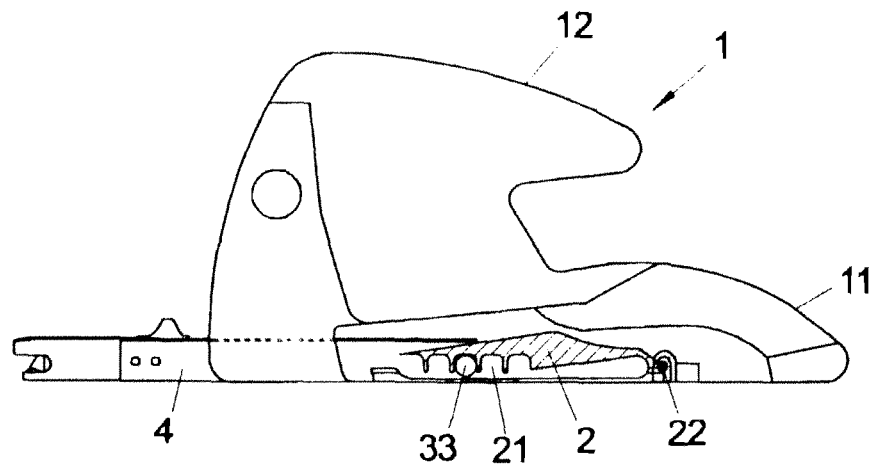
FIG. 4 shows the child seat of FIGS. 2A, 2B and 3, wherein the connecting tube of the fastening device is locked into place in a transverse groove of the latching plate

FIG. 4 shows the child seat 1 with a position of the bow 3 in which the base 33 has snapped into place in one of the transverse grooves 21 of the latching plate 2. This latching position corresponds with a certain length by which the connecting elements 4 protrude from the child seat 1. By locking the bow 3 into place in another one of the transverse grooves 21 (by swiveling the latching plate 2, as described with reference to FIGS. 2B and 3), the length by which the connecting elements 4 protrude from the child seat 1 can be adjusted.

Figure 5:
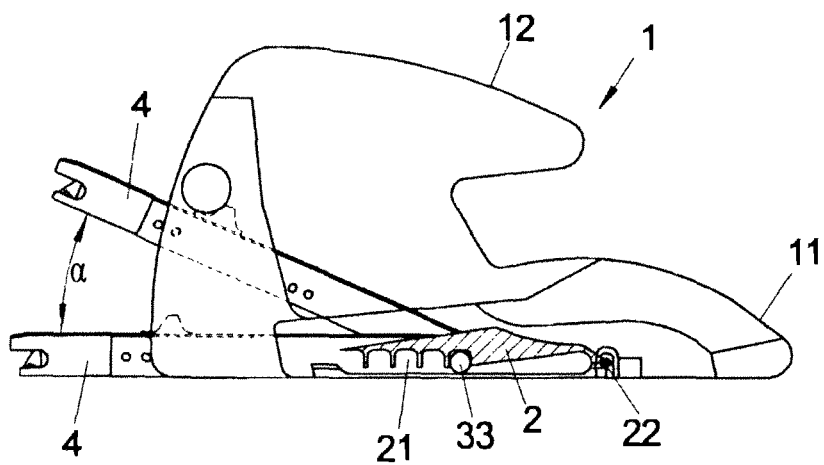
FIG. 5 shows the child seat of FIGS. 2A, 2B, 3 and 4, wherein a pivotability of the connecting tube and the connecting elements attached thereto is illustrated.

FIG. 5 shows the rotatability of the bow 3 provided due to the formation of the connecting tube 3 circular in cross-section, wherein the axis of rotation for the rotation of the connecting elements 4 extends parallel to the axis of the base 33. The angle of rotation α, which for example is 16°, 18° or 20°, likewise is shown.

The invention is not limited in its design to the exemplary embodiments described above, which should merely be understood by way of example. For example, the shape of the bent connecting tube can be chosen differently, the latching plate can be designed in some other way and/or be provided with transverse grooves in some other way. Moreover, the illustrated shape of the child seat and the connecting elements should merely be understood by way of example.

The priority application, German Patent Application Number 10 2010 000 780.3, filed Jan. 11, 2010 is incorporated by reference herein.

The invention claimed is:

1. A fastening device for a child vehicle seat, which comprises:
    two connecting elements which are suitable and formed to cooperate with anchoring means arranged on a vehicle for fixing a child seat on the vehicle, wherein the connecting elements are formed or arranged at two ends or end regions of a bent connecting tube, and the connecting tube has a portion between its ends which is rotatably mountable on the child seat; and
    a latching plate which forms at least two transverse grooves which each serve to receive a portion of the connecting tube;
    wherein the connecting tube is mountable on the latching plate in various longitudinal positions, wherein to each longitudinal position a transverse groove of the latching plate is associated.

2. The fastening device according to claim 1, wherein the connecting tube is formed symmetrically.

3. The fasting device according to claim 1, wherein the connecting tube is formed U-shaped with two legs and a base, wherein one of the legs of the connecting tube each forms a connecting element or is connected with such connecting element and the base of the connecting tube is mountable on the child seat.

4. The fastening device according to claim 1, wherein the connecting tube is formed as round tube.

5. The fastening device according to claim 1, wherein the connecting tube is formed in one piece.

6. The fastening device according to claim 1, wherein the connecting elements form connecting bodies which each are put onto an end or an end region of the connecting tube.

7. The fastening device according to claim 1, wherein the connecting tube is rotatably mountable on the child seat such that the connecting elements are pivotable on the child seat in vertical direction.

8. The fastening device according to claim 1, wherein the connecting tube is mountable on the child seat so as to be adjustable in various longitudinal positions.

9. The fastening device according to claim 1, wherein the latching plate is spring-biased.

10. A child vehicle seat with a fastening device according to claim 1, wherein the connecting tube of the fastening device is rotatably mounted on the child seat.

11. The child seat according to claim 10, wherein the child seat forms coulisses which provide for swiveling the connecting tube relative to the child seat.

12. A fastening device for a child vehicle seat, which comprises:
  two connecting elements which are suitable and formed to cooperate with anchoring means arranged on a vehicle for fixing a child seat on the vehicle, wherein the connecting elements are formed or arranged at two ends or end regions of a bent connecting tube, and the connecting tube has a portion between its ends which is rotatably mountable on the child seat;
  wherein the connecting tube is rotatably mountable on the child seat such that the connecting elements are pivotable on the child seat in a vertical direction; and
  wherein the connecting tube can be swiveled over an angular range up to 20° proceeding from a horizontal position.

13. The fastening device according to claim 12, further comprising a latching plate which forms at least two transverse grooves which each serve to receive a portion of the connecting tube.

14. The fastening device according to claim 13, wherein the connecting tube is mountable on the latching plate in various longitudinal positions, wherein to each longitudinal position a transverse groove of the latching plate is associated.

15. A fastening device for a child vehicle seat, which comprises:
  two connecting elements which are suitable and formed to cooperate with anchoring means arranged on a vehicle for fixing a child seat on the vehicle, wherein the connecting elements are formed or arranged at two ends or end regions of a bent connecting tube, and the connecting tube has a portion between its ends which is rotatably mountable on the child seat; and
  a latching plate which forms at least two transverse grooves which each serve to receive a portion of the connecting tube;
  wherein the latching plate is pivotable about an axis of rotation, wherein in a first, non-swiveled basic position of the latching plate the connecting tube extends and is mounted in one of the transverse grooves of the latching plate and in a second, swiveled position of the latching plate is movable relative to the latching plate.

* * * * *